United States Patent
Akai et al.

(10) Patent No.: US 7,593,090 B2
(45) Date of Patent: Sep. 22, 2009

(54) MANUFACTURING PROCESS OF LIQUID CRYSTAL PANEL AND LIQUID CRYSTAL PANEL

(75) Inventors: Yoshihiro Akai, Tottori (JP); Masayuki Kametani, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 59 days.

(21) Appl. No.: 10/595,234

(22) PCT Filed: Sep. 24, 2004

(86) PCT No.: PCT/JP2004/013902

§ 371 (c)(1),
(2), (4) Date: Jan. 31, 2007

(87) PCT Pub. No.: WO2005/031449

PCT Pub. Date: Apr. 7, 2005

(65) Prior Publication Data

US 2007/0165177 A1      Jul. 19, 2007

(30) Foreign Application Priority Data

Sep. 29, 2003    (JP)    ............................. 2003-336732

(51) Int. Cl.
*G02F 1/1339*    (2006.01)
*G02F 1/1335*    (2006.01)

(52) U.S. Cl. ........................ 349/189; 349/153; 349/154; 349/190

(58) Field of Classification Search ........................ None
See application file for complete search history.

(56) References Cited

U.S. PATENT DOCUMENTS

| 5,936,695 | A | 8/1999 | Hida | |
| 6,768,533 | B2 * | 7/2004 | Hanakawa et al. | 349/153 |
| 6,774,968 | B2 * | 8/2004 | Hagiwara | 349/139 |
| 6,844,911 | B2 * | 1/2005 | Lee | 349/190 |
| 7,215,405 | B2 * | 5/2007 | Kim et al. | 349/187 |
| 2003/0107699 | A1 * | 6/2003 | Jung et al. | 349/153 |

FOREIGN PATENT DOCUMENTS

| JP | 07-110489 | 4/1995 |
| JP | 08-094984 | 4/1996 |

(Continued)

*Primary Examiner*—Tina M Wong
(74) *Attorney, Agent, or Firm*—SoCal IP Law Group LLP; Steven C. Sereboff; John E. Gunther

(57) ABSTRACT

A process for manufacturing a liquid crystal panel where a liquid crystal is held between a pair of substrates is characterized by marking a specified figure on one substrate, detecting the specified figure on the one substrate, applying a sealing material according to a predetermined pattern and providing a liquid crystal encapsulation opening in the vicinity of the marking, joining another substrate paired with the one substrate thereto, cutting the joined substrates to obtain a pair of substrates, injecting a liquid crystal material through the liquid crystal encapsulation openings of the pair of substrates thus obtained, and closing the liquid crystal encapsulation openings. According to the invention, a process for manufacturing a liquid crystal panel in which positioning of the liquid crystal encapsulation opening is facilitated in the step of applying the sealing material can thereby be provided.

6 Claims, 5 Drawing Sheets

FOREIGN PATENT DOCUMENTS

| | | |
|---|---|---|
| JP | 09-318957 | 12/1997 |
| JP | 2000-039599 | 2/2000 |
| JP | 2002-174819 | 6/2002 |
| JP | 2002-303842 | 10/2002 |
| JP | 2003-222886 | 8/2003 |

\* cited by examiner

Fig.2
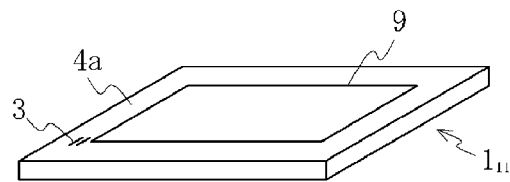
Fig. 2A
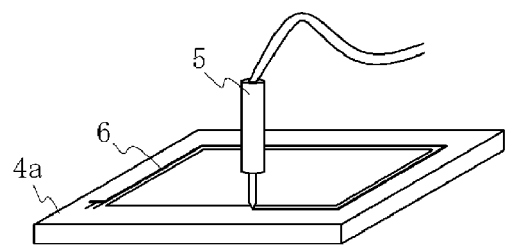
Fig. 2B
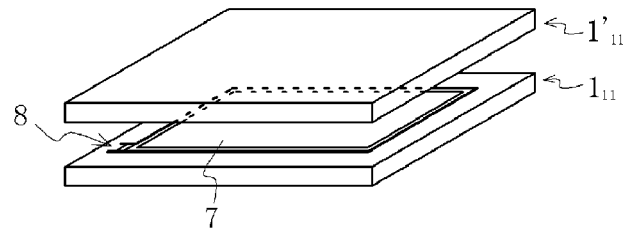
Fig. 2C
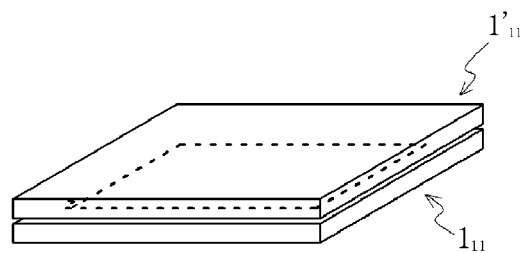
Fig. 2D

Fig.5
Fig. 5A
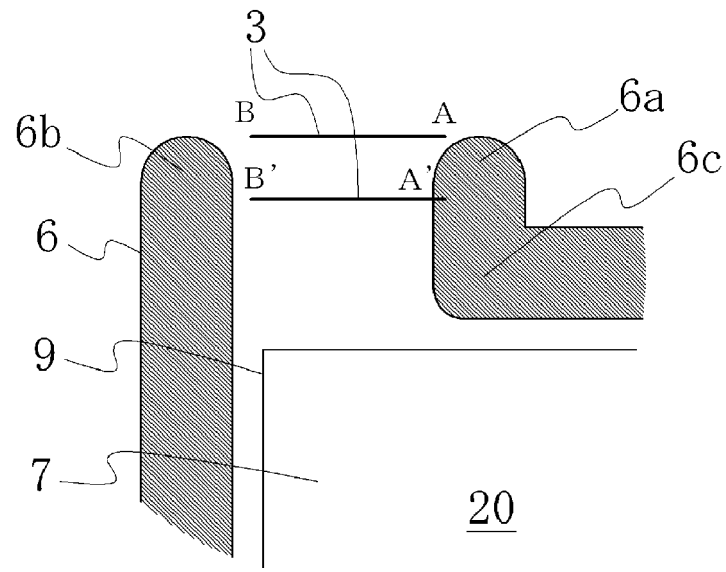
Fig. 5B
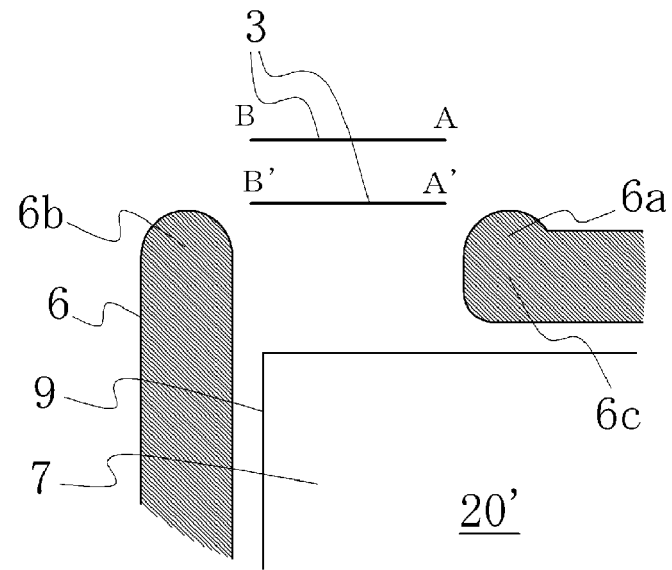

MANUFACTURING PROCESS OF LIQUID CRYSTAL PANEL AND LIQUID CRYSTAL PANEL

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

The present invention relates to the process of manufacturing a liquid crystal panel and a liquid crystal panel, and more particularly to the process of manufacturing a liquid crystal panel which facilitates positioning and selection of a liquid crystal encapsulation opening by means of applying a sealing material to a liquid crystal panel, and a liquid crystal panel manufactured by means of the said process.

2. Description of the Related Art

A pair of substrates and a sealing material for sealing in liquid crystal filled between the pair of substrates are necessary for constructing a liquid crystal panel for use in a liquid crystal display device.

The most common process for manufacturing liquid crystal panels used for producing liquid crystal display devices constitutes the joining of one large mother substrate on which multiple substrates are formed on one side thereof to another large mother substrate on which multiple substrates are likewise formed on one side thereof, and then cutting them into liquid crystal panels having a specific size (refer to Japanese Laid-Open Patent Publication No. 2002-365648 as example, hereinafter "Patent Document 1").

The process of manufacturing the liquid crystal device and the liquid crystal device disclosed in Patent Document 1 relates to the joining of large mother substrates to each other by means of a sealing material, and are then precisely cut into liquid crystal panels of a specific size, ensuring that the surface of the cut pieces do not break as would affect the performance of the liquid crystal device. In more detail, the liquid crystal device includes a pair of substrates joined via a sealing material, liquid crystal being sealed in an encapsulating area defined by the sealing material between the pair of substrates, where the sealing material is configured to surround the encapsulating area, and includes a liquid crystal sealing portion which extends along at least one end surface of the two substrates, and an extended portion configured along the end surface of a line extending on the along-end portion, thereby facilitating a cut along a planned cross section when cutting the liquid crystal panels into specific sizes from the large mother substrates.

The liquid crystal panel is formed by joining two substrates by means of a sealing material arranged to surround a liquid crystal encapsulation opening, and then injecting liquid crystal into the liquid crystal encapsulation opening without leaving any unfilled spaces, and then closing the liquid crystal encapsulation opening, but in this case some liquid crystal may fall off during the process of sealing, resulting in the loss of liquid crystal and contamination of the liquid crystal panel. Methods have been disclosed in a large number of patent documents to prevent this problem, and one such disclosure pertaining to a liquid crystal panel body and the process of manufacturing the same made in Japanese Laid-Open Patent Publication No. H09-113920 (hereinafter, "Patent Document 2") will be described hereafter.

Patent Document 2 discloses a liquid crystal panel body and the process of manufacturing the same, in which the incidents of loss of liquid crystal and contamination of the liquid crystal panel due to the falling off of liquid crystal during sealing are eliminated, and incomplete sealing of the liquid crystal is avoided by clarifying the relationship between the liquid crystal encapsulation opening and the display portion by using stripe-shaped spacers. In particular, Patent Document 2 discloses a liquid crystal panel body manufactured by applying a single-axis alignment process along a specified direction to at least one of a pair of substrates which are arranged opposite to each other such that straight electrodes are approximately orthogonal to each other, and at least one of which is transparent, forming stripe-shaped spacer members on at least one of the substrates, joining the pair of substrates via the spacer members, thereby bringing them in contact with each other, and filling the elongated spaces surrounded by the substrates and the stripe-shaped spacer members with liquid crystal, where the end surface of one substrate on which the liquid crystal encapsulation opening is to be provided is tilted, and the space generated at the liquid crystal encapsulation opening when the substrate is joined to the other substrate is designated as a liquid crystal reservoir with a volume corresponding to the required quantity of encapsulation, the liquid crystal encapsulation opening being arranged at the center of the liquid crystal reservoir, where the width thereof is equal to or larger than half the width of the display portion, and the striped spacers are provided within a range surrounded by lines having an angle of 60° in relation to a perpendicular line extending from the liquid crystal encapsulation opening to the display portion, and originate from the liquid crystal encapsulation opening.

There are two known methods for applying the sealing material in these processes of manufacturing liquid crystal display panels, one of which is the screen print method and the other pertains to a drawing method by means of a dispenser.

The screen print method prints a screen on a substrate indicating predetermined portions for applying and sealing liquid crystal by means of a squeegee on the substrate, while the drawing method employs a dispenser to apply the sealing material directly on a substrate.

According to the method of application by means of the screen print method, the position at which the sealing material is to be applied is fixed in advance by the screen, thereby greatly reducing the possibility of dislocation of the liquid crystal encapsulation opening used to encapsulate the liquid crystal, while ensuring that the liquid crystal encapsulation opening remains stably fixed during the production of liquid crystal panels from large mother substrates, and the method is therefore appropriate for large-scale production. According to the method of application by means of the drawing method employing a dispenser, the sealing material is directly applied to each substrate of the liquid crystal panel, making it difficult to keep the liquid crystal encapsulation opening in place, as it may be dislocated during the process of making multiple liquid crystal panels from large mother substrates, and the method is therefore unsuitable for large-scale production.

Patent Document 1 does not clearly describe a specific method for applying the sealing material. Since the sealing material is not separated from the respective liquid crystal panels during production of multiple liquid crystal panels from large mother substrates, it becomes necessary to provide for a large screen if the screen print method were to be used in applying the sealing material, and it is thus impractical to use such method. Therefore, according to the method disclosed in Patent Document 1, it may be assumed that the application of the sealing material is made by means of the drawing method using a dispenser. In this case, the sealing material is applied to many patterns defined across the entire substrate, making it highly possible for the liquid crystal encapsulation opening to be dislocated and therefore difficult to neatly fill the liquid crystal into the liquid crystal encapsulation area.

On the other hand, while the possibility of spillage of liquid crystal is eliminated in the liquid crystal panel body and the manufacturing process therefor disclosed in Patent Document 2, the substrates must be independently processed by machining which involves a complicated operation of a series of manufacturing steps and is therefore inappropriate for producing multiple liquid crystal panels from large mother substrates.

SUMMARY OF THE INVENTION

In view of the foregoing problems of the prior art, the inventor has analyzed the various processes of manufacturing liquid crystal panels disclosed in Patent Document 1 which pertains to the process of manufacturing multiple liquid crystal panels of a specific size from large mother substrates, whereby the problem of spillage of liquid crystal during encapsulation thereof is addressed by facilitating location of the liquid crystal encapsulation opening when application of sealing material is performed by means of the drawing method using a dispenser, and facilitating detection of liquid crystal panels having a displaced liquid crystal encapsulation opening before the injection of liquid crystal. In the process, the inventor has discovered that the above-mentioned problems can be solved by affixing in advance a certain mark at a position where the liquid crystal encapsulation opening is to be provided on a substrate, which would enable detection of the position of the ends of the sealing material.

Accordingly, the present invention aims to provide a process for manufacturing multiple liquid crystal panels of a specific size from large mother substrates, and a liquid crystal panel manufactured by means of such process, where the liquid crystal encapsulation opening can be easily located when the sealing material is applied by means of the drawing method using a dispenser, and a liquid crystal panel having a displaced liquid crystal encapsulation opening formed by the above method of manufacturing is easily detected before injection of the liquid crystal.

The objects of the present invention can be attained by means of the following configurations. According to the first aspect of the present invention, a process for manufacturing a liquid crystal panel is provided, whereby liquid crystal is filled between a pair of substrates, comprising the following steps:

(1) marking a specified figure on one of the substrates;

(2) detecting the specified figure on one such substrate, applying sealing material according to a predetermined pattern, and providing a liquid crystal encapsulation opening in the vicinity of marking;

(3) joining one substrate with the other substrate as to be paired together;

(4) cutting the joined substrates to obtain the pair of substrates;

(5) injecting liquid crystal material through the liquid crystal encapsulation opening of the pair of substrates thus obtained; and (6) closing the liquid crystal encapsulation opening.

According to the above aspect, the specified figure preferably consists of a line which extends in parallel with one edge of the liquid crystal encapsulation opening, or may consist of two lines which extend in parallel with one edge of the liquid crystal encapsulation opening, and are arranged between both ends of the sealing material.

Moreover, according to a second aspect of the present invention, a process for manufacturing a liquid crystal panel is provided, where liquid crystal is filled between a pair of substrates, comprising the following steps:

(1) marking a specified figure on one of the substrates;

(2) applying a sealing material on one such substrate according to a predetermined pattern specified for each of the pair of substrates, and providing a liquid crystal encapsulation opening;

(3) joining one substrate with the other substrate as to be paired together;

(4) cutting the joined substrates to obtain the pair of substrates;

(5) detecting the positions of the specified figure and the liquid crystal encapsulation opening, and selecting the pair of substrates having one end of the sealing material within a predetermined range;

(6) injecting liquid crystal material through the liquid crystal encapsulation opening of the pair of substrates thus obtained; and (7) closing the liquid crystal encapsulation opening.

According to this aspect, the specified figure preferably consists of a line which extends in parallel with one edge of the liquid crystal encapsulation opening, or may consist of two lines which extend in parallel with one edge of the liquid crystal encapsulation opening, and are arranged between both ends of the sealing material.

Further, the third aspect of the present invention provides for a liquid crystal panel manufactured according to the second aspect of the invention, whereby a specified figure is formed on one side of one substrate and sealing material is applied to provide a liquid crystal encapsulation opening in the vicinity of the specified figure and one side of the second substrate is joined to the first substrate by means of the sealing material, and liquid crystal material is encapsulated between the pair of substrates, and a closing member is provided for closing the liquid crystal encapsulation opening.

According to this aspect, the specified figure preferably consists of a line which extends in parallel with one edge of the liquid crystal encapsulation opening, or may consist of two lines which extend in parallel with one edge of the liquid crystal encapsulation opening, and are arranged between both ends of the sealing material.

The present invention provides the following excellent effects by employing the afore-described configurations. Namely, in accordance with the process of manufacturing a liquid crystal panel of the first aspect, since one of the pair of substrates is marked with a specified figure at the time of manufacturing, the position at which the sealing material is to be applied can be detected by means of a detection device, thereby eliminating the possibility of erroneously locating the starting point and end point of the sealing material. Moreover, since the liquid crystal encapsulation opening is disposed at the end of the pair of substrates, the injection of the liquid crystal is facilitated, and the possibility of liquid crystal falling off and the like thus decreases when the liquid crystal is automatically injected, thereby improving the process yield thereof.

On this occasion, since the specified figure simply consists of a line or two lines extending in parallel with one edge of the liquid crystal encapsulation opening, the figure can be easily and precisely drawn, resulting in increased precision in the application of the sealing material.

Moreover, in the process of manufacturing a liquid crystal panel according to the second aspect of the invention, since pairs of substrates on which the sealing material is normally applied are selected to exclude defective pairs of substrates before the injection of the liquid crystal to the space between the substrates, the liquid crystal will be injected only into the qualified pairs of substrates, thereby reducing the amount of wasted expensive liquid crystal. At the same time, since the liquid crystal encapsulation opening is disposed at the end of the pair of substrates, the injection of the liquid crystal is facilitated, the injection of the liquid crystal is facilitated, and the possibility of liquid crystal falling off and the like thus decreases when the liquid crystal is automatically injected, thereby improving the process yield thereof.

Further, according to the third aspect of the invention, it is possible to provide liquid crystal panel of high quality in which encapsulation of the liquid crystal is ensured.

DESCRIPTION OF THE DRAWINGS

FIGS. 2A to 2D are descriptive diagrams pertaining to the manufacturing steps of one array substrate formed from large base substrates in the process of manufacturing liquid crystal panels according to the present invention

FIGS. 5A and 5B are enlarged partial views showing two examples of the liquid crystal encapsulation opening with a defective shape.

DETAILED DESCRIPTION

The present invention will be described hereafter with reference to drawings. The following embodiment simply refers to an example of the process of manufacturing liquid crystal panels embodying the technical idea of the present invention, and the liquid crystal panel produced in such manner, and is not intended to restrict the present invention to this process of manufacturing liquid crystal panels and the liquid crystal panel produced by this manufacturing process, as other embodiments included in the claims may equally apply without departing from the technical idea shown in the scope of the claims for a patent for the invention.

FIRST EMBODIMENT

Figure 1:
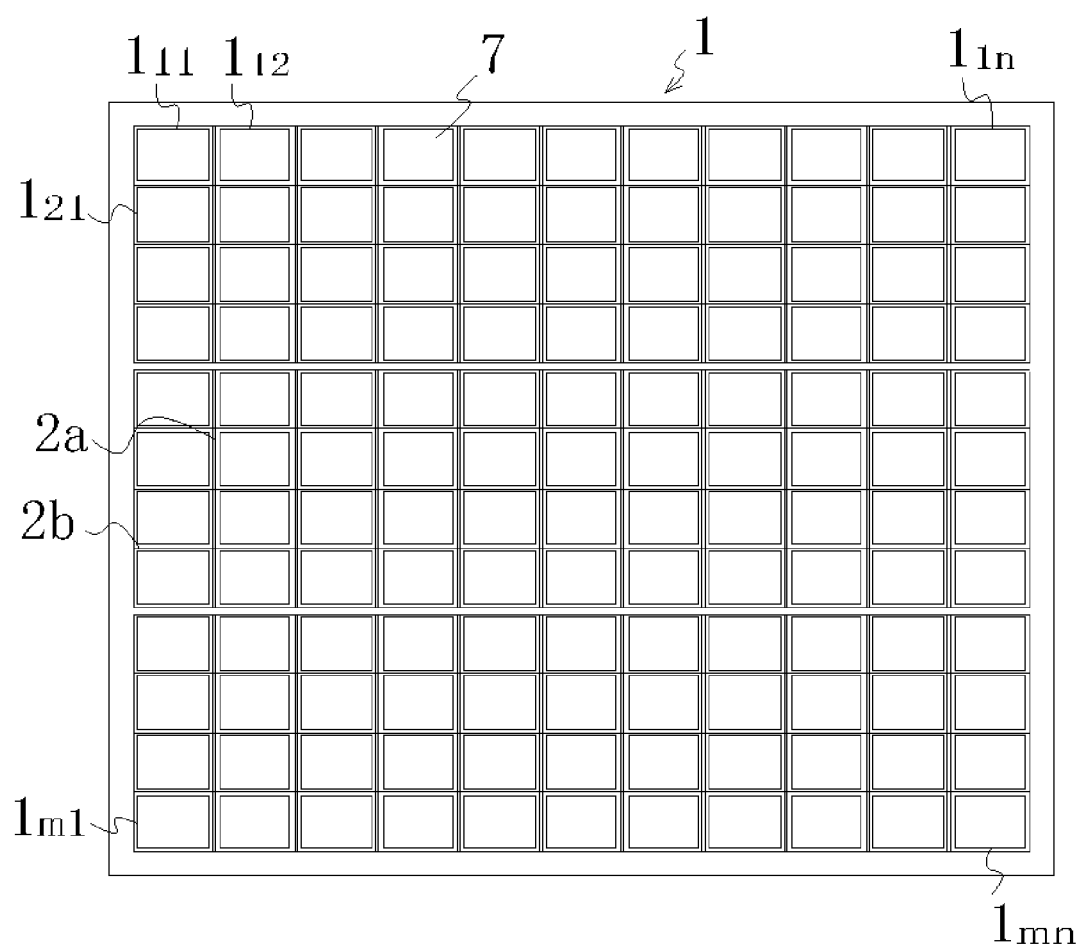
FIG. 1 is a front view of a large base substrate on which array substrates for liquid crystal panels according to the present invention are formed.

A description will now be given of a preferred embodiment of the present invention. FIG. 1 is a front view of a large base substrate upon which a multiple array of substrates is formed, each of which is respectively paired with a color filter substrate to constitute a liquid crystal panel according to the present invention. It should be noted that the substrate on which multiple color filter substrates are formed is also large and resides opposite the first large substrate. FIGS. 2A to 2D are descriptive diagrams pertaining to the sequential manufacturing steps of one array substrate formed from large base substrates in the process of manufacturing liquid crystal panels according to the present invention.

Figure 3:
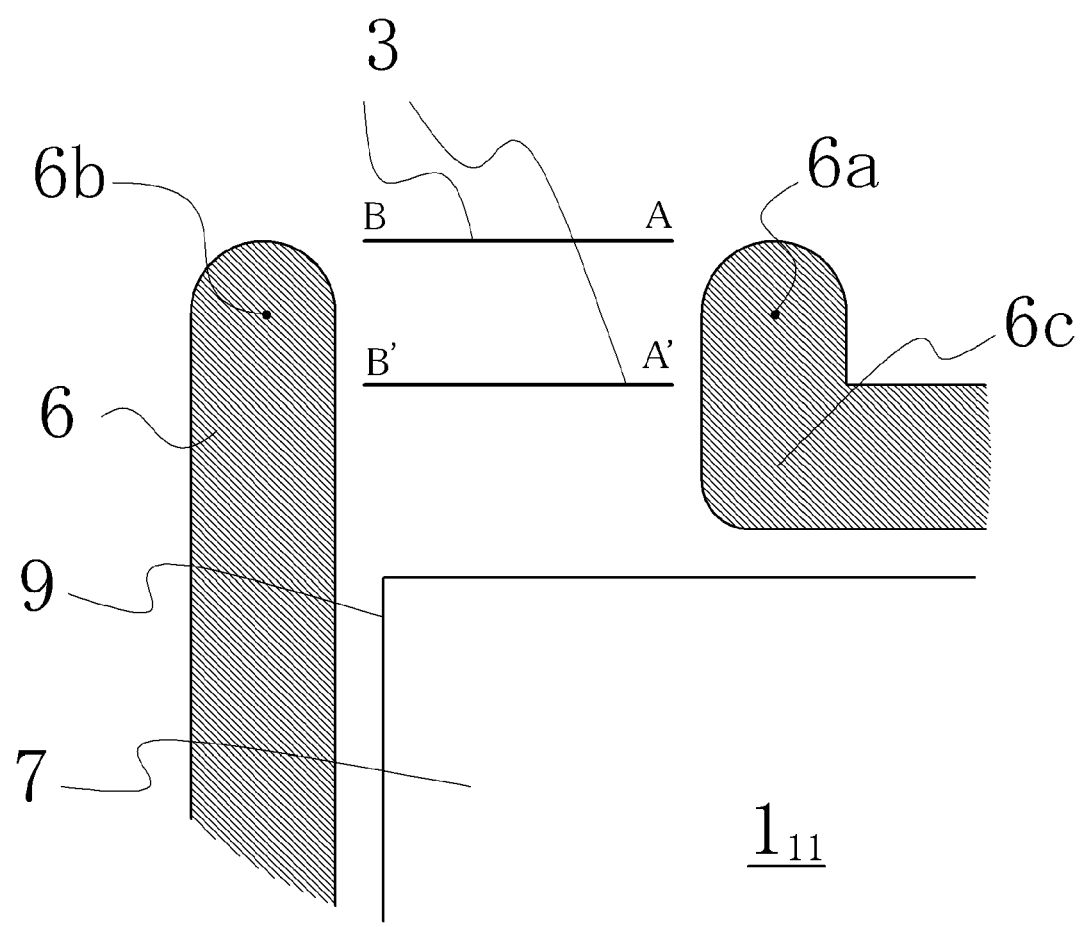
FIG. 3 is an enlarged partial view of the liquid crystal encapsulation opening shown in FIG. 2C.

FIG. 3 is an enlarged partial view of the liquid crystal encapsulation opening shown in FIG. 2C.

Figure 4:
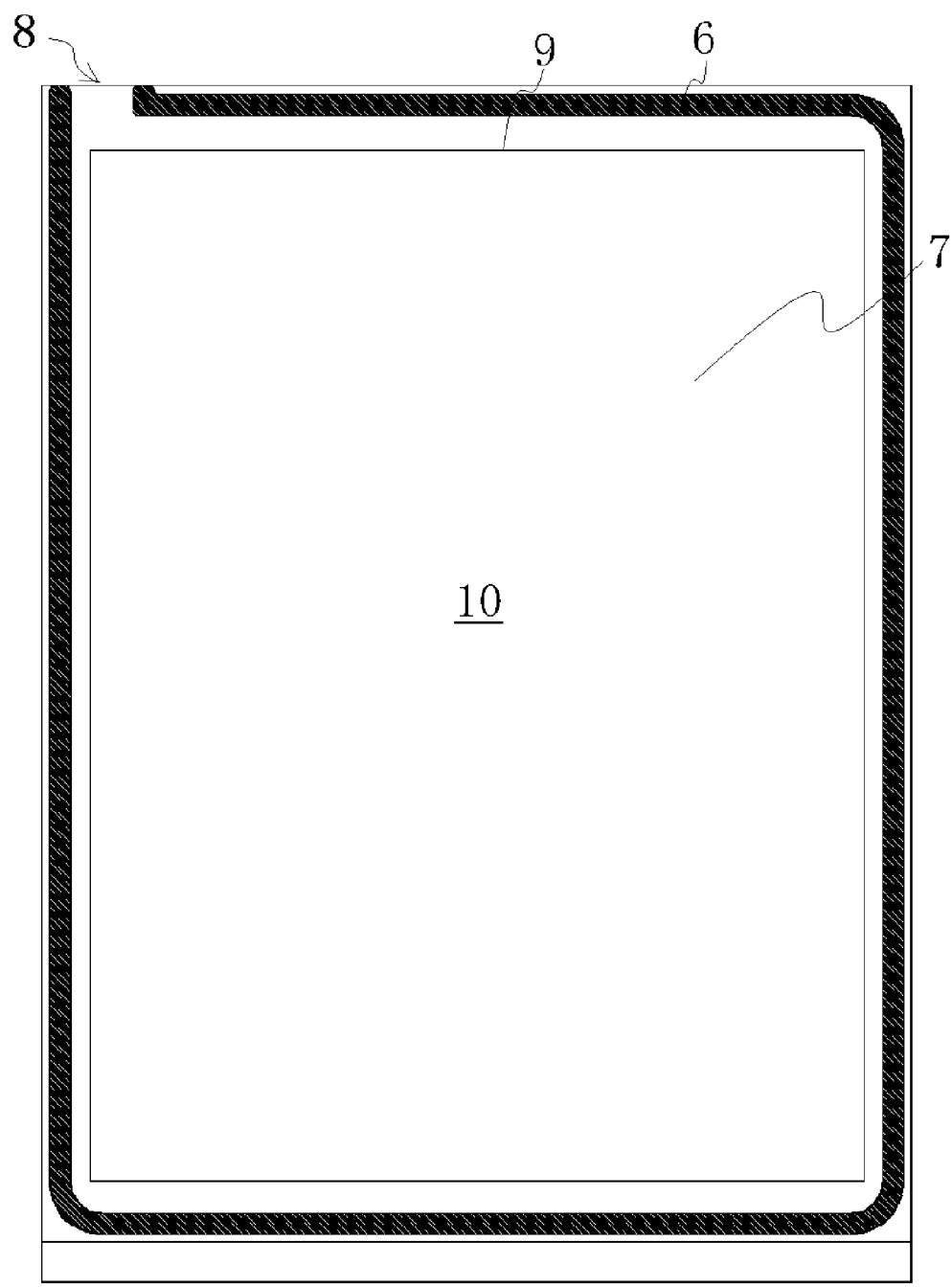
FIG. 4 is a front sectional view of a pair of substrates formed in accordance with the steps drawn in FIGS. 2A to 2D, and then produced by cutting into specified sizes.

FIG. 4 is a front sectional view of a pair of substrates formed by joining the first large base substrate and large opposing substrate according to the manufacturing steps shown in FIGS. 2A to 2D and cutting the unified substrate into specific sizes.

The large base substrate 1 illustrated in FIG. 1 comprises a glass substrate having a perfectly flat surface without any recesses, protrusions, or undulations. For effective manufacturing of liquid crystal panels, the area in which array substrates of specific size are formed is densely arranged as a matrix of m rows and n columns, and multiple predetermined cut lines 2a and 2b are respectively provided to cut the area lengthwise and widthwise.

A display control section constituting input/output terminals and TFT elements is provided on the respective array substrates $1_{11}$ to $1_{mn}$ of specific size surrounded by the multiple planned cut lines 2a and 2b, and specific figures are made on portions on which liquid crystal encapsulation openings 8 for the purpose of encapsulating the liquid crystal as a marking for providing the liquid crystal encapsulation openings 8.

Such a figure is used to detect a starting point and an end point when coating application material using a dispenser 5, and an arbitrary figure may be employed as long as the figure is of a specific length and orientation. Although the figure may consist of one or multiple lines, a rectangle, or multiple points, a position detector attached to the dispenser 5, for example, should easily detect the position thereof.

Moreover, a sealing material 6 is applied to a specific position of specific shape while the movement of the dispenser 5 or the large base substrate 1 is being controlled in the X-Y direction, and the line 3 is preferably a line extending in parallel with one edge of the liquid crystal encapsulation opening 8, or more preferably, two lines extending in parallel with such an edge of the liquid crystal encapsulation opening 8, and arranged between both ends of the sealing material 6. In this way, it would be possible to easily define the directions in which the sealing material 6 is to be applied as the parallel and perpendicular directions with respect to the edge on which the liquid crystal encapsulation opening 8 is provided. FIGS. 2 and 3 show the line 3 as two parallel lines of the same length.

The lines 3 used as a mark are provided at a certain position for the respective array substrates $1_{11}$ to $1_{mn}$. This configuration facilitates positioning, and reduces erroneous injection of liquid crystal. Specifically, the lines 3 are provided at inner opening of the liquid crystal encapsulation opening 8. This is because the array substrate should preferably remain as flat as possible when the sealing material 6 is applied, and the lines 3 are thus to be provided at positions which will not possibly cause the sealing material 6 to overlap at the liquid crystal encapsulation opening 8. Moreover, it is apparent that the figure can be changed to suit individual user demands and preferences. For example, the figure may vary according to the shape of the nozzle used to inject the liquid crystal, or the amount of the liquid crystal to be injected.

The respective work steps relating to the process of manufacturing the array substrate according to the present invention will be described hereafter with reference to FIGS. 2A to 2D. It should be noted that FIGS. 2A to 2D clearly describe the steps involved in generating individual array substrates from the large base substrates. FIGS. 2A to 2D thus describe the array substrate $1_{11}$ as a representative.

The array substrate $1_{11}$ shown in FIG. 2A is formed in an area surrounded by the planned cut lines 2a and 2b which are drawn to respective specified lengths on the large base substrate 1 (refer to FIG. 1). On a surface 4a of the array substrate $1_{11}$, two lines 3 are provided in advance, with a length equal to that of one edge of the liquid crystal encapsulation opening 8, and are parallel with each other according to the size of the liquid crystal panel, the position of the liquid crystal encapsulation opening 8, or the like. Although a glass substrate is usually used as the large base substrate 1, a transparent resin substrate may be used.

The lines 3 are provided to extend in a direction to close the opening of the liquid crystal encapsulation opening 8, namely in parallel with the edge of the liquid crystal encapsulation opening 8 of the array substrate $1_{11}$. Moreover, the two lines 3 are provided with a specified interval therebetween. The lines 3 may be a mark or a small scratch which can be easily detected by the position detector attached to the dispenser 5. After the TFT elements used to drive the liquid crystal and the display control unit (not shown) including the input/output terminals are provided on the array substrate $1_{11}$, an alignment film 9 is provided by means of a rubbing process according to each liquid crystal encapsulation area 7, and a certain amount of spacers (not shown) made of silica, polystyrene, or the like is then encapsulated. If the lines 3 are formed by means of etching when gate electrodes constituting the TFT elements are formed, for example, it is possible to eliminate the independent process for providing the lines 3.

The next step of applying the sealing material 6 on the surface of the obtained array substrate $1_{11}$ as described above is shown in FIG. 2B. The sealing material 6 is applied using the dispenser 5 by drawing along ends of the alignment film 9 formed by means of rubbing on the liquid crystal encapsulation area 7, and is simultaneously carried out along the ends of the lines 3 provided in advance in the vicinity of the liquid crystal encapsulation opening 8, and such ends are parallel to each other along the lines 3 toward the outside of the array substrate $1_{11}$. Epoxy resin, phenol resin, or the like, which is one-component thermosetting resin, may be preferably used as the sealing material 6.

A color filter substrate $1'_{11}$ of a large opposing substrate 1' which is to be paired with the large base substrate 1 is then placed above the array substrate $1_{11}$ after doing the above-mentioned steps as shown in FIG. 2C, after which the array substrate $1_{11}$ and the color filter substrate $1'_{11}$ are joined to each other by means of the sealing material 6 to obtain a pair of substrates as shown in FIG. 2D.

A detailed description will now be given of the method for applying the sealing material 6 with reference to FIG. 3. The position detector (not shown) attached to the dispenser 5 is made to detect ends A, A', B, and B' of the two lines 3, to obtain a point 6a which is disposed equally from the ends A and A' by a specified distance, and similarly to obtain a point 6b which is disposed equally from the ends B and B' by a specified distance. From the point 6a as starting point to the point 6b as end point, the dispenser 5 applies the sealing material 6 across a specified distance starting from the point 6a to a point 6c perpendicularly to the two lines 3 downward with respect to FIG. 3, then across a specified distance from the point 6c perpendicularly rightward with respect to FIG. 3, then across a specified distance from the previous end point perpendicularly rightward, not shown, and then across a specified distance from the previous end point to the end point 6b perpendicularly rightward to complete the application step, for example.

In this way, the dispenser 5 can be automatically moved once publicly known control means is used to set the directions and the distances of the movements in advance. Moreover, instead of moving the dispenser 5, it is possible to apply the sealing material 6 by moving a table supporting the array substrate $1_{11}$ while the dispenser 5 remains fixed.

Although description is given of the case where the sealing material 6 is applied from the starting point 6a to the end point 6b in a clockwise direction in FIGS. 2 and 3, it is apparent for those skilled in the art that 6b may be set as the starting start point, and 6a may be set as the end point. In either case, if the direction of the placement of the array substrate 11 is constantly maintained, it is possible to easily control the movement of the dispenser 5 and to increase precision in application as well, since it is possible to automatically define the starting and end points of the application with respect to the end positions of the two lines 3 in the above example, and moreover, to automatically define the direction of the application with respect to the direction of the lines 3.

In the step involving the application of the sealing material carried out in this manner, either of the starting point 6a or the end point 6b of the application of the sealing material 6 should be made to extend by a certain length outwardly, and upwardly in FIG. 3. This configuration is provided to prevent the liquid crystal from overflowing from the liquid crystal encapsulation opening 8 during encapsulation, and such length is to be set with reference to the lines 3, for example.

Moreover, the lines 3 can be used in the following way. First, when the sealing material 6 is applied, the detection of the figure is not carried out for the lines 3, and the sealing material 6 is applied by the dispenser 5. After the application of the sealing material 6, the lines 3 are used to determine whether the sealing material 6 has been precisely applied for the respective pairs of substrates which are produced by joining the array substrate $1_{11}$ and the color filter substrate $1'_{11}$ to each other. Namely, the lines 3 may be used as a means for selecting the pairs of substrates on which the sealing material 6 has been normally applied. This is particularly significant considering that liquid crystal material is very expensive, and wasteful injection of liquid crystal can be avoided by rejecting in advance pairs of substrates on which the end positions of the sealing material 6 have not reached optimal position. The selection step will be described in detail in the following section.

FIG. 4 shows the pair of substrates 10 formed in the steps shown in FIGS. 2A to 2D, and thereafter cut into a specific size. The cutting method employed on this occasion is the scribe/brake method or the laser scribing method, which is generally used, whereby a cut surface of the end provided with the liquid crystal encapsulation opening 8 is obtained by cutting along the outer line A-B of the lines 3 of the liquid crystal encapsulation opening 8, for example. The pair of substrates 10 cut by means of the above cutting method is provided with the liquid crystal encapsulation area 7 formed by the array substrate $1_{11}$ the color filter substrate $1'_{11}$, and the sealing material 6 joining them, and the liquid crystal is encapsulated in the liquid crystal encapsulation area 7 through the liquid crystal encapsulation opening 8.

The encapsulation method of the liquid crystal preferably uses a nozzle or the like through the liquid crystal encapsulation opening 8. With this configuration, since the liquid crystal encapsulation opening 8 can be provided with a small displacement, if the quantity of the injected liquid crystal is set, and a nozzle is used for injection, it is possible to prevent spillages of liquid crystal even if a liquid crystal encapsulation machine is used for the operation. Moreover, all steps can be automatically carried out as a series of operations, resulting in an increase in process yield. Additionally, according to this embodiment, since the sealing material 6 is applied by means of the drawing method using the dispenser 5, it is possible to eliminate the need to produce a screen to fit the size of the liquid crystal panel or the size of the encapsulation opening as in the case of applying the sealing material by means of the screen print method, thereby reducing the cost of a multi-variety small-lot production.

A description will now be given of the above-described step of detecting and selecting pairs of substrates upon which the sealing material has been normally applied with reference to FIGS. 5A and 5B. It should be noted that the FIGS. 5A and 5B are partial enlarged views showing shapes of the applied sealing material 6 in the vicinity of the liquid crystal encapsulation opening 8 of pairs of substrates 20 and 20' that have been detected and selected as two examples of defective substrates.

FIG. 5A shows an example where a portion A' at the right end of two lines A-B and A'-B' representing the lines 3 formed at the liquid crystal encapsulation opening 8 overlaps the sealing material 6 on the pair of substrates 20. In this case, since the width of the liquid crystal encapsulation opening 8 formed by the sealing material 6 is narrower than a certain pre-determined width, if spillage of liquid crystal is high during injection thereof, the pair of substrates 20 are thus considered defective, and injection of liquid crystal is not carried out in the next step.

FIG. 5B shows an example where a distal end portion of the sealing material 6 does not reach the middle portion between the two lines A-B and A'-B' which represent lines 3 formed at the liquid crystal encapsulation opening 8 on the pair of substrates 20'. In this case, since the liquid crystal opening 8 does not reach the end of the pair of substrates 20', the liquid crystal spills during the injection process, and the pair of substrates 20' are thus considered defective, and injection of liquid crystal is not carried out in the next step.

In this way, since the step of determining whether the sealing material 6 has been normally applied to all the pairs of substrates produced thereby and selecting the pairs of substrates where the sealing material 6 has been normally applied, it is possible to exclude the defective pairs of substrates before the injection of the liquid crystal even if the liquid crystal encapsulation opening is defective due to more or less excessive sealing material 6, or a displacement of the positioning, thereby avoiding wasteful consumption of expensive liquid crystal. At the same time, it also becomes possible to unify the shape of the liquid crystal encapsulation opening of the pair of substrates used for encapsulating liquid crystal to a certain shape, and uniformity in the quality of the finished liquid crystal panels can be achieved, and automation of the process of encapsulating the liquid crystal is facilitated.

If the lines are used for the purpose of selection in this manner, one line would be sufficient, and acceptability of the liquid crystal panel may be determined based on whether the ends of the sealing material reach the line.

Moreover, although the lines are formed on the array substrate according to the embodiment, the same may be also formed on the color filter substrate. If the lines are simultaneously formed on the color filter substrate when a black matrix is formed for light shielding, it would not be necessary to separately provide for the step of forming lines.

It is claimed:

1. A process for manufacturing a liquid crystal panel wherein liquid crystal is filled between a pair of substrates, comprising the following steps:
   marking a specified figure on one of the substrates;
   forming a seal pattern on the substrate marked with the specified figure, forming a seal pattern further comprising:
      detecting the specified figure,
      determining a start point and an end point in relationship to the specified figure, and
      applying sealing material from the start point to the end point according to a predetermined pattern, wherein the predetermined pattern provides a liquid crystal encapsulation opening in the vicinity of the specified figure;
   joining one substrate with the other substrate as to be paired together;
   cutting the joined substrates to obtain the pair of substrates;
   injecting liquid crystal material through the liquid crystal encapsulation opening of the pair of substrates thus obtained; and
   closing the liquid crystal encapsulation opening.

2. The process for manufacturing a liquid crystal panel according to claim 1, wherein the specified figure consists of two lines that extend in parallel with one edge of the liquid crystal encapsulation opening, and are arranged between both ends of the sealing material.

3. A process for manufacturing a liquid crystal panel wherein liquid crystal is filled between a pair of substrates, comprising the following steps:
   marking a specified figure on one of the substrates;
   applying a sealing material on one of the substrates according to a predetermined pattern the predetermined pattern providing a liquid crystal encapsulation opening;
   joining one substrate with the other substrate as to be paired together;
   cutting the joined substrates to obtain the pair of substrates;
   detecting the positions of the specified figure and the liquid crystal encapsulation opening;
   selecting a pair of substrates where the seal material is normally applied, the selecting based on the position of the liquid crystal encapsulation opening with respect to the specified figure;
   injecting liquid crystal material through the liquid crystal encapsulation opening of the selected pair of substrates; and
   closing the liquid crystal encapsulation opening.

4. The process for manufacturing a liquid crystal panel according to claim 3, wherein the specified figure consists of two lines that extend in parallel with one edge of the liquid crystal encapsulation opening, and are arranged between both ends of the sealing material.

5. A liquid crystal panel comprising:
   a first substrate having a specified figure formed on one side;
   sealing material formed on the first substrate, the dealing material providing a liquid crystal encapsulation opening in the vicinity of the specified figure;
   a second substrate whose side is joined to the first substrate by means of the sealing material;
   liquid crystal material that is encapsulated between the pair of substrates; and
   a closing member for closing the liquid crystal encapsulation opening,
   wherein the sealing material is formed by the process comprising:
      detecting the specified figure;
      determining a start point and an end point in relation to the specified figure; and
      applying sealing material from the start point to the end point according to a predetermined pattern, wherein the predetermined pattern provides the liquid crystal encapsulation opening in the vicinity of the specified figure.

6. The liquid crystal panel according to claim 5, wherein the specified figure consists of two lines that extend in parallel with one edge of the liquid crystal encapsulation opening, and are arranged between the start point and the end point of the sealing material.

* * * * *